United States Patent Office 3,790,538
Patented Feb. 5, 1974

3,790,538
PROCESS FOR THE PRODUCTION OF THERMO-REVERSIBLE COACERVATES
Nikolaus Schön, Leverkusen, Germany, assignor to Bayer Aktiengesellschaft, Leverkusen, Germany
No Drawing. Filed Feb. 17, 1971, Ser. No. 116,252
Claims priority, application Germany, Mar. 4, 1970, P 20 10 117.1
Int. Cl. C08f 15/02
U.S. Cl. 260—29.6 H        6 Claims

ABSTRACT OF THE DISCLOSURE

A process for the production of a thermoreversible coacervate, wherein from 30 to 70 mol percent of acrylic acid and from 70 to 30 mol percent of acrylamide is copolymerized in aqueous solution at a temperature of from 15° to 80° C. using redox catalyst comprising a water soluble persulphate and a reducing agent, and the polymer solution obtained is optionally cooled to a temperature below 15° to 30° C.

---

It is known that polymers can form certain weak temperature-dependent intermolecular bonds. The effect of these bonds, generally produced by ionic groups, is for example that aqueous solutions of gelatin form gels at temperatures below about 30 to 40° C. because of the additional bonds and become thinly liquid at temperatures above this gelling temperature. Synthetic polymers resembling gelatin, in that they show similar thermoreversible gelatin, have also been described. U.S. patent specifications Nos. 2,461,023, 2,476,527 and 2,506,537 relate to copolymers of methacrylamide and methacrylic acid which are produced with benzoyl peroxide and give solutions showing reversible gelling at certain pH values.

Another phenomenon which is attributable to weak intermolecular bonds is coacervation, i.e. the phase separation with formation of a polymer-rich aqueous phase. Phase separation is achieved, for example by adding salts or alcohol to a concentrated solution of gelatin whose pH value is as close as possible to the isoelectric point. The coacervate, i.e. the polymer-rich phase, still contains from about 25 to 50% of the original quantity of water. In complex coacervation (cf. Bungenberg de Jong, Kolloid Z., 58 (1932), p. 209), a dilute gelatin solution, having a pH value below or equal to its isoelectric point, is mixed with a solution of gum arabic, the opposite charges resulting in weak ionic crosslinking and hence in the formation of a coacervate. These coacervates are thermoreversible, redisssolving above a certain temperature.

The present invention relates to a process for the production of a thermoreversible coacervate wherein from 30 to 70 mol percent of acrylic acid and from 70 to 30 mol percent of acrylamide is copolymerized in aqueous solution at a temperature of from 15 to 80° C. using a redox catalyst comprising a water soluble persulphate and a reducing agent, and the polymer solution obtained is optionally cooled to a temperature below 15 to 30° C. The polymerization reaction is carried out in the absence of oxygen in an inert gas atmosphere, for example nitrogen or argon. The aqueous monomer solutions used are also oxygen-free.

The monomer solutions used contain acrylamide and acrylic acid, each in a quantity of from 30 to 70 mol percent. It is preferred to use monomer solutions which contain substantially 50 mol percent of acrylamide and 50 mol percent of acrylic acid. The total concentration of monomers in the solution can preferably be from 3 to 30% by weight, based on water although it is most preferred to employ a concentration of from 5 to 15% by weight. Water soluble persulphate of uni- or polyvalent cations can be used, for example persulphates of alkaline metals or alkaline earth metals.

Suitable catalysts include combinations of potassium persulphate $K_2S_2O_8$, natrium persulphate $Na_2S_2O_8$ or ammonium persulphate $(NH_4)_2S_2O_8$ with a reducing agent, for example, sodium pyrosulphite $Na_2S_2O_5$, sodium sulphite $Na_2SO_3$, sodium bisulphite $NaHSO_3$, sodium thiosulphate $Na_2S_2O_3$, sodium dithionate $Na_2S_2O_4$, a corresponding potassium salt or sodium formaldehyde sulphoxylate, formamidine sulphinic acid or sodium-p-toluene sulphinate etc.

The quantity of persulphate can preferably be from 0.05 to 5 parts by weight per 100 parts by weight of total monomer, although polymerization is most preferably carried out with from 0.3 to 1.5 parts by weight per 100 parts by weight of monomer. The reducing agents are preferably used in quantities of from ⅓ to ¾ of the equivalent of the oxidizing agent.

The polymerization reaction is carried out at a temperature in the range from 15 to 80° C. Higher polymerization temperatures lead to copolymers which form unsatisfactory coacervates. The polymerization temperature is normally in the range from 20 to 50° C.

As a rule, the polymerization reaction is over after 1 to 3 hours at a temperature in this range. The coacervates are formed during cooling of the polymer solution obtained, providing the polymerization temperature is above the transition temperature of the coacervate, or alternatively the coacervate is actually formed during the polymerization reaction. Cooling is initially accompanied by hazing, which is followed by the formation of a second phase. The polymer-rich phase is precipitated as the lower phase. The transition temperatures vary somewhat and are governed both by the composition of the catalyst and by the monomer ratio, although in general they are in the range from 15 to 30° C. Above their transition temperatures, the coacervates re-enter into solution, giving homogeneous polymer solutions. The coacervate/polymer solution transition is reversible; in other words, it can be carried out as often as required in either direction by corresponding changes in temperature. The coacervates have water contents of from 70 to 90% by weight and are free-flowing, viscous to paste-like compositions whose consistency is also governed to a considerable extent by the molecular weight of the polymers.

It was completely surprising that synthetic coacervates should be obtained under the polymerization conditions according to the invention. Comparative tests with equivalent monomer mixtures of acrylamide/methacrylic acid, methacrylamide/acrylic acid or methacrylamide/methacrylic acid actually resulted in precipitation of polymer during the polymerization reaction. The copolymers formed do not dissolve following an increase in the temperature to 100° C.; in other words, they are not thermoreversible coacervates.

When acrylic acid/acrylamide is used, coacervate formation is governed to a considerable extent by the molar ratio of the two monomers. If the proportion of acrylamide or of acrylic acid is increased to e.g. 75 mol percent, phase separation does occur during cooling, but the coacervation transition temperature is very low. Phase separation occurs only at temperatures of about 0° to 5° C.

The choice of the catalyst system is also of crucial importance. If the persulphate/reducing agent combination is replaced, for example, by azodiisobutyronitrile and the polymerization of equimolar acrylamide/acrylic acid mixtures is carried out at temperatures between 60 and 90° C., it is only possible to obtain polymer solutions which do not shown any phase separation or coacervate formation. Polymer solutions which do not show any coacervate formation are also obtained with catalyst systems such as cumene hydroperoxide, p-methane hydroperoxide or t-butyl hydroperoxide in combination with Rongalite or with benzoyl peroxide.

The synthetic coacervates according to the invention can be used, for example, for the production of coatings, microcapsules etc. in the same way as the gelatin/gum arbic coacervates. They have the advantage of reproducible production in contrast to the fluctuations in quality in the natural products. The carboxyl groups and the amide groups promote secondary reactions, for example crosslinking reactions, with the result that the properties of the coatings, shells or microcapsules can be specifically influenced. The yields of coacervate in the process according to the invention are extremely favorable. The copolymer is distributed almost exclusively in the coacervate, the supernatant water phase being practically free from polymers.

Particularly interesting applications are made possible by preparing solutions of the coacervates at temperatures above the transition temperature and immersing cooled articles in the solutions or by applying the solutions to cooled articles. The coacervates are deposited on to the surfaces of the articles, so that it is possible in this way to produce coatings comprising these thermoreversible systems.

EXAMPLE 1

In a vessel equipped with stirring mechanism, a monomer solution was prepared from 1850 parts by weight of distilled water, 80 parts by weight of acrylic acid and 80 parts by weight of acrylamide, in the absence of oxygen in a nitrogen atmosphere. 0.6 part by weight of $$(NH_4)_2S_2O_8$$

and 0.4 part by weight of $Na_2S_2O_5$, each dissolved in 20 parts by weight of water, were added to the monomer solution at 20° C. The solution was heated to 30° C., as a result of which polymerization began immediately, accompanied by an increase in the viscosity of the solution. The temperature was kept at from 30 to 35° C. Polymerization was after 2 hours, a 98% conversion being obtained. When cooled to 25° C., the solution began to haze and a second phase was gradually formed. After 2 hours, phase separation had progressed to such an extent that, above the liquid coacervate layer, there were 950 parts by weight of water still containing in solution 5 parts by weight of polymer which were only precipitated as the coacervate at 0 to 5° C.

When the main coacervate was heated while stirring to 30° C. in the presence of the supernatant water phase, the two phases were dissolved and a homogeneous solution was again formed. Re-cooling to 25° C. was again accompanied by phase separation. The main coacervate had a viscosity $ln\ \eta_r/c$ of 6.57. $\eta_r$ is the relative solution viscosity and $c$ the concentration in g./100 ml. of water. Viscosity is measured on a 0.05% by weight solution in water at 25° C. with 1% by weight on NaCl added in order to suppress the interaction between the macromolecules at a shear stress $\tau=0.99$ dyn./cm.$^2$ and at a pH value of 7. NaOH is used for neutralization.

EXAMPLE 2

A mixture of 80 parts by weight of acrylamide and 80 parts by weight of acrylic acid was polymerized in the same way as in Example 1, except that the catalyst system consisted of 0.6 part by weight of $(NH_4)_2S_2O_8$ and 0.2 part by weight of $Na_2S_2O_5$. After 2 hours, the conversion amounted to 97%. The polymer solution separated into two phases on cooling to 25° C. A supernatant aqueous phase comprising 1010 parts by weight was formed. The coacervate went back into solution at 30° C. Viscosity (measured as in Example 1) $ln\ \eta_r/c.=6.8$. The coacervate contained 95% of the copolymer.

EXAMPLE 3

The conditions were as described in Example 1, except that the following components, each dissolved in 20 parts by weight of water are added as catalyst components in the order in which they are set out: 1,6 parts of formamidine sulphinic acid (freshly recrystallized), 0.5 part of $Na_2S_2O_5$ and 1.0 part of $(NH_4)_2S_2O_8$. Polymerization was carried out at 35° C. After 2.5 hours, the conversion amounted to 97.5%. On cooling to 25° C., a coacervate was quickly precipitated, the quantity of supernatant aqueous phase being 1050 parts by weight. On heating to 35° C., the coacervate went back into solution. Measurement of the viscosity, as in Example 1, revealed in $ln\ \eta_r/c$-value of 5.7.

EXAMPLE 4

86 parts by weight of methacrylic acid and 71 parts by weight of acrylamide were dissolved in 1850 parts by weight of water in the absence of oxygen in a nitrogen atmosphere. 0.6 part by weight of $(NH_4)_2S_2O_8$ and 0.4 part by weight of $Na_2S_2O_5$, each dissolved in 30 parts by weight of water, were added as catalyst and the solution was heated to 20° C. The viscosity of the solution quickly increased, the temperature being maintained at 30 to 35° C. After 2 hours, the conversion amounted to 96%. The polymer had precipitated in flake form in the reaction medium. The realtion mixture was heated to 95° C., but the copolymer did not enter into solution. The copolymer was gradually dissolved by neutralization with ammonia. Although a clear solution was obtained at pH 7, it did not show any phase separation on cooling to 0° C. The concentration, based on the polymer used, amounted to 6.8%.

EXAMPLE 5

72 parts by weight of acrylic acid and 85 parts by weight of methacrylamide were copolymerized under the same conditions as in Example 4. After 2.5 hours, the conversion amounted to 98%. The copolymer had precipitated from the monomer solution in the form of white flakes which settled. It was not possible to dissolve the copolymer by heating to 95° C. The copolymer could only be dissolved by neutralization to pH 7 with ammonia, although there were no signs of phase separation on cooling to 0° C.

EXAMPLE 6

(a) 85 parts by weight of methacrylamide and 86 parts by weight of methacrylic acid were copolymerized under the conditions of Example 5, a 98% conversion being obtained after 2 hours under the same temperature conditions. The copolymer was precipitated in the form of a viscous, water-containing polymer lump as the lower phase. The copolymer in the supernatant aqueous phase could not be dissolved by heating to 95° C. The copolymer only entered into solution during neutralization with ammonia to pH 7. There were no signs of phase separation during cooling of the solution whose concentration amounted to 7.5%, based on the copolymer.

(b) The same mixture was polymerized at 80° C. with 0.5 part by weight of benzoyl peroxide, a conversion of 96% being obtained after 2.5 hours. The copolymer had precipitated in the form of flakes and did not dissolve even after heating at 95 to 100° C. Dissolution only occurred during neutralization with ammonia to pH 7. The solution did not show any signs of phase separation on cooling to 3° C.

EXAMPLE 7

(a) A monomer mixture of 40 parts by weight acrylamide in 120 parts by weight of acrylic acid was polymerized under the same conditions as in Example 1. After 2 hours, the conversion amounted to 96% and the viscosity $ln\ \eta_r/c$ of the copolymer to 7.38. A coacervate only began to precipitate from the polymer solution on cooling to 5° C., being redissolved at 20° C.

(b) The procedure was as described above except that the monomer mixture consisted of 120 parts by weight of acrylamide and 40 parts by weight of acrylic acid. After 2 hours, the conversion amounted to 95% and the viscosity $ln\ \eta_r/c$ of the copolymer to 4.35.

Coacervate formation only occurred on cooling to 3° C., the coacervate being redissolved on heating to 20° C.

EXAMPLE 8

A series of tests was carried out under the conditions of Example 1, except that changes were made to the catalyst system. The results of the tests are set out in the following table:

TABLE.—EXAMPLE 8

| Test No. | Catalyst (parts by weight) | Conversion, percent | Coacervate Formation (T, °C.) | Coacervate Dissolution (T, °C.) | Supernatant aqueous phase (parts) | $\ln \eta_r / c$ (copolymer in the coacervate) |
|---|---|---|---|---|---|---|
| (a) | (0.6) $(NH_4)_2S_2O_8$, (0.4) $Na_2S_2O_5$ | 97 | 27 | 30 | 980 | 6.83 |
| (b) | (0.6) $K_2S_2O_8$, (0.4) $Na_2S_2O_5$ | 97.5 | 25 | 29 | 1,120 | 6.77 |
| (c) | (0.6) $(NH_4)_2S_2O_8$, (0.3) Rongalite [1] | 96 | 28 | 32 | 980 | 10.93 |
| (d) | (0.6) $(NH_4)_2S_2O_8$, (0.3) $Na_2SO_3$ | 98 | 28 | 32 | 960 | 10.74 |
| (e) | (0.6) $(NH_4)_2S_2O_8$, (0.4) $Na_2S_2O_3 \cdot 5H_2O$ | 96 | 27 | 31 | 900 | 9.77 |
| (f) | (0.6) $(NH_4)_2S_2O_8$, (0.3) $Na_2S_2O_4 \cdot 2H_2O$ | 98 | 20 | 30 | 1,170 | 9.45 |
| (g) | (0.6) bisazoiosobutyronitrile [2] | 95 | No coacervate formation | | | 12.08 |
| (h) | (0.5) cumene hydroperoxide, (0.1) Rongalite [3] | 94 | No coacervate formation | | | 15.08 |
| (i) | (0.5) p-menthane hydroperoxide,[3] (0.1) Rongalite | 95 | No coacervate formation | | | 10.6 |
| (k) | (1.5) t-butyl hydroperoxide,[3] (0.1) Rongalite | 93 | Hazing | | | 11.56 |
| (l) | (0.5) benzoylperoxide [2] | 96.5 | No coacervate formation | | | 6.88 |

[1] Sodium formaldehyde sulphoxylate.
[2] Polymerization for 2 hours at 90° C.
[3] Polymerization at 35° C.

NOTE.—In tests (c), (d), (e) and (f) the proportion of polymer in the supernatant aqueous phase was determined, amounting on average to less than 4%, based on the total yield.

What is claimed is:

1. A process for producing a thermoreversible coacervate wherein an aqueous solution consisting of water, 3 to 70% by weight, based on said water, of a monomer mixture of 30 to 70 mol percent of acrylic acid and 70 to 30 mol percent of acrylamide and a catalytic amount of a redox catalyst consisting essentially of a water-soluble persulphate and a reducing agent is polymerized in the absence of oxygen at a temperature of from 15 to 80° C. to form an aqueous copolymer solution and wherein said copolymer solution is cooled to a temperature below the coacervate transition temperature of 15 to 30° C. to effect a coacervate phase separation.

2. The process of claim 1 wherein the polymerization temperature is from 20 to 50° C.

3. The process of claim 1 wherein said reducing agent is sodium or potassium pyrosulphite, sulphite, bisulphite, thiosulphite or dithionite, sodium formaldehyde sulphoxylate, formamidine sulphinic acid or sodium-p-toluene sulphinate.

4. The process of claim 1 wherein the persulphate is sodium, potassium or ammonium persulphate.

5. The process of claim 1 wherein the amount of said persulphate is 0.05 to 5 parts by weight per 100 parts of said monomer mixture and the amount of reducing agent is from ⅓ to ¾ of the equivalent of said persulphate.

6. A thermoreversible coacervate produced by the process of claim 1.

References Cited

UNITED STATES PATENTS

| | | | |
|---|---|---|---|
| 2,461,023 | 2/1949 | Barnes et al. | 95—7 |
| 2,476,527 | 7/1949 | Barnes et al. | 260—8 |
| 2,506,537 | 5/1950 | Barnes et al. | 260—29.6 |
| 3,493,500 | 2/1970 | Volk et al. | 210—54 |
| 3,509,113 | 4/1970 | Monagle et al. | 260—79.3 |

STANFORD LEVIN, Primary Examiner

U.S. Cl. X.R.

260—80.3 N